Oct. 23, 1928.
C. A. JUENGST
1,688,970
ART OF AND MACHINE FOR ASSEMBLING BOOKS
Filed Sept. 7, 1923 14 Sheets-Sheet 6
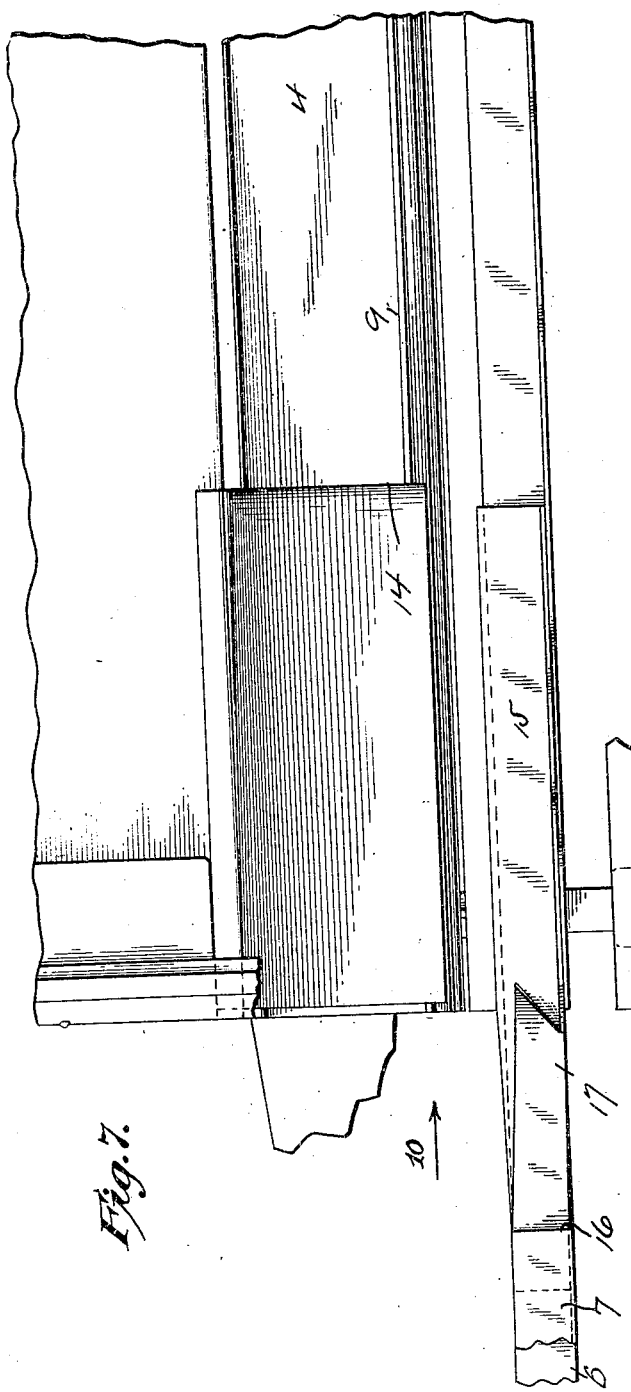
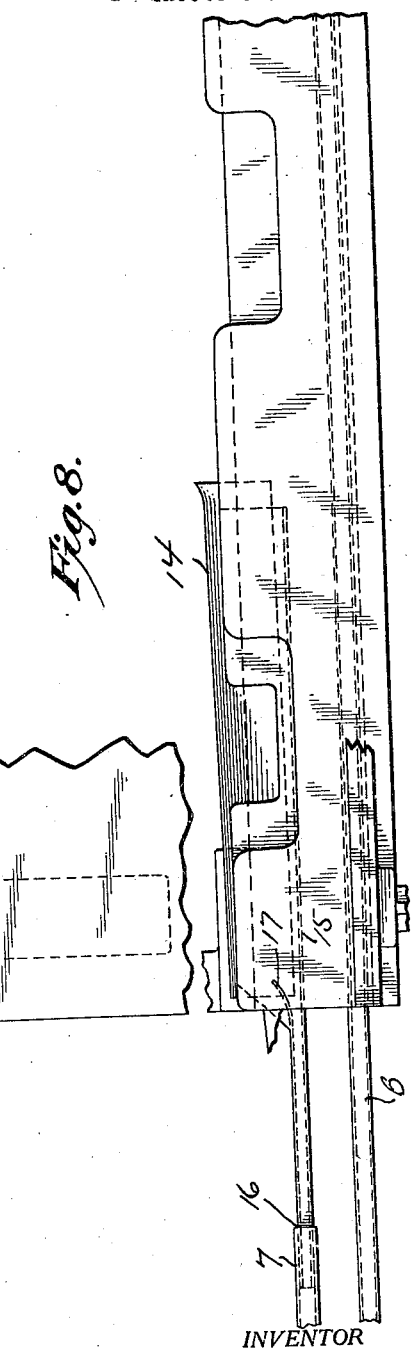
INVENTOR
Charles A. Juengst
BY
ATTORNEY Oct. 23, 1928.　　　　　　　　　　　　　　　1,688,970
C. A. JUENGST
ART OF AND MACHINE FOR ASSEMBLING BOOKS
Filed Sept. 7, 1923　　14 Sheets-Sheet 7

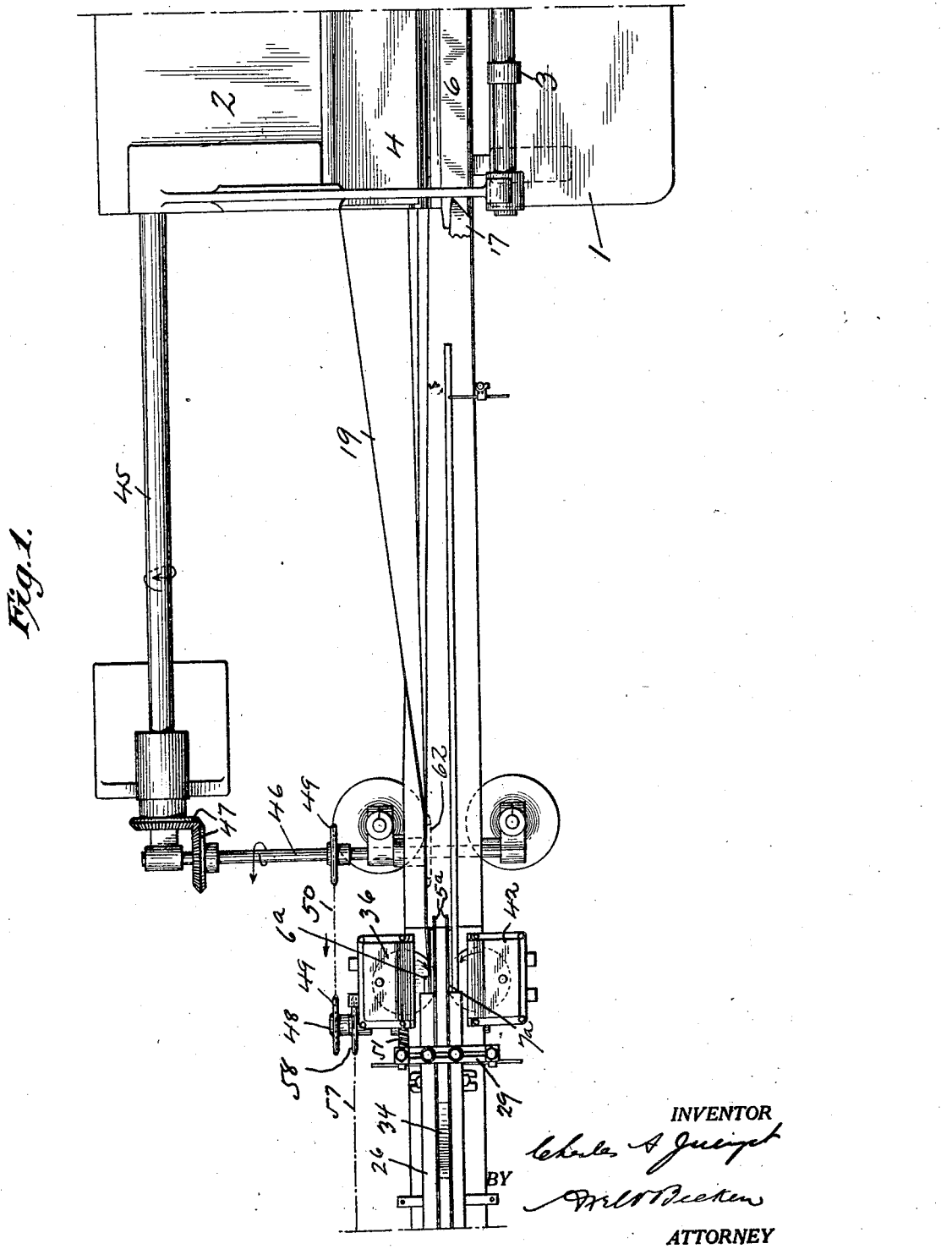

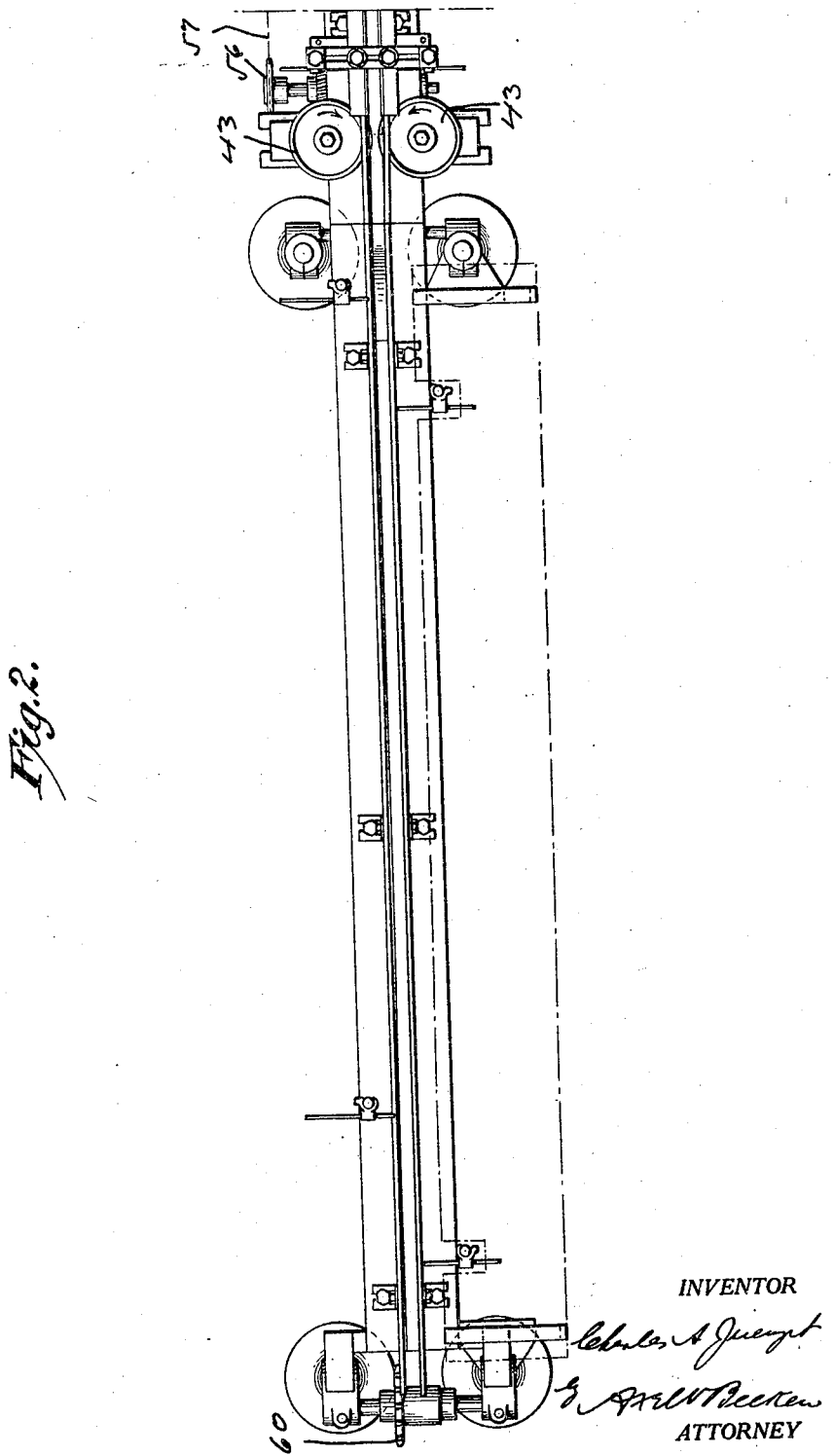

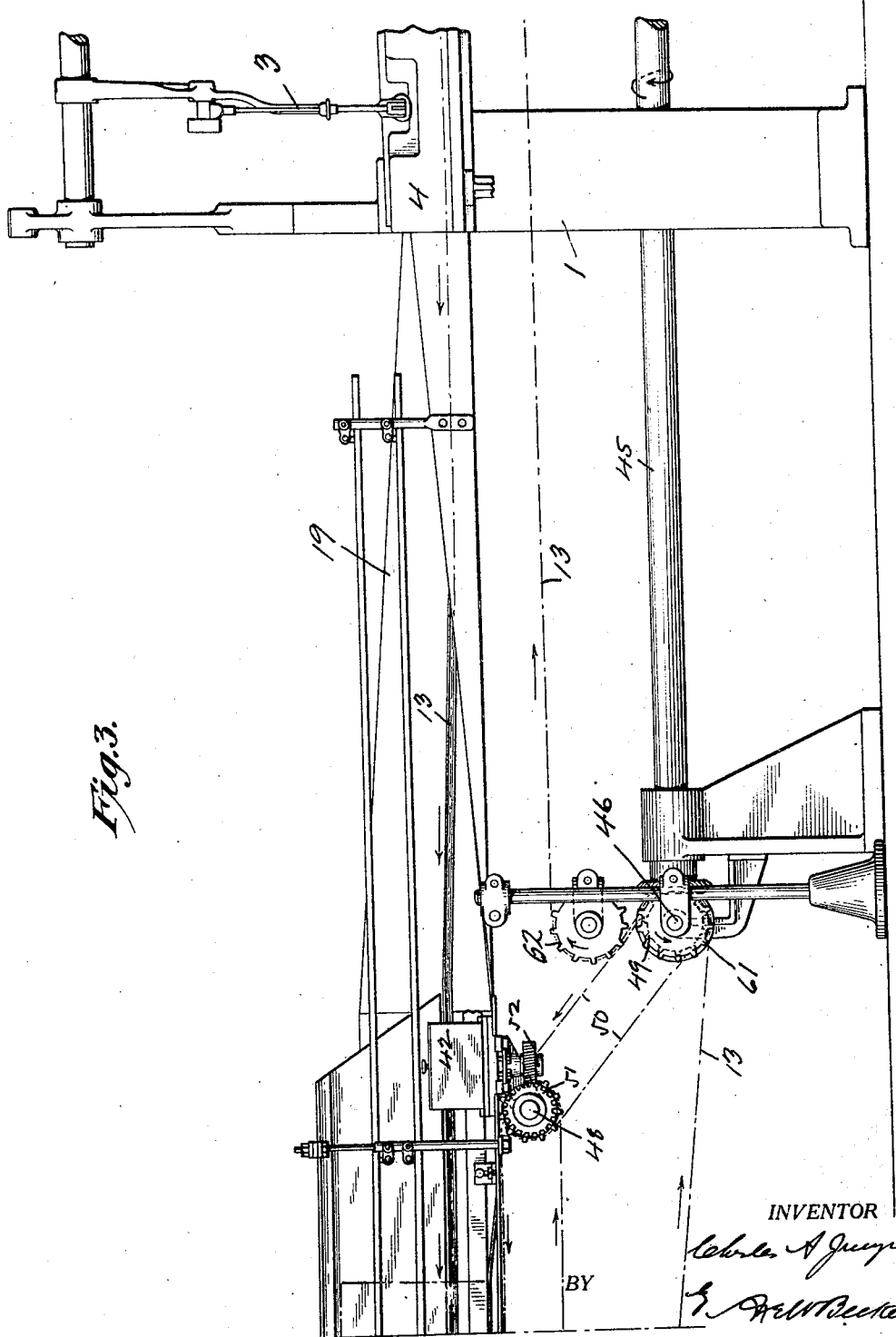

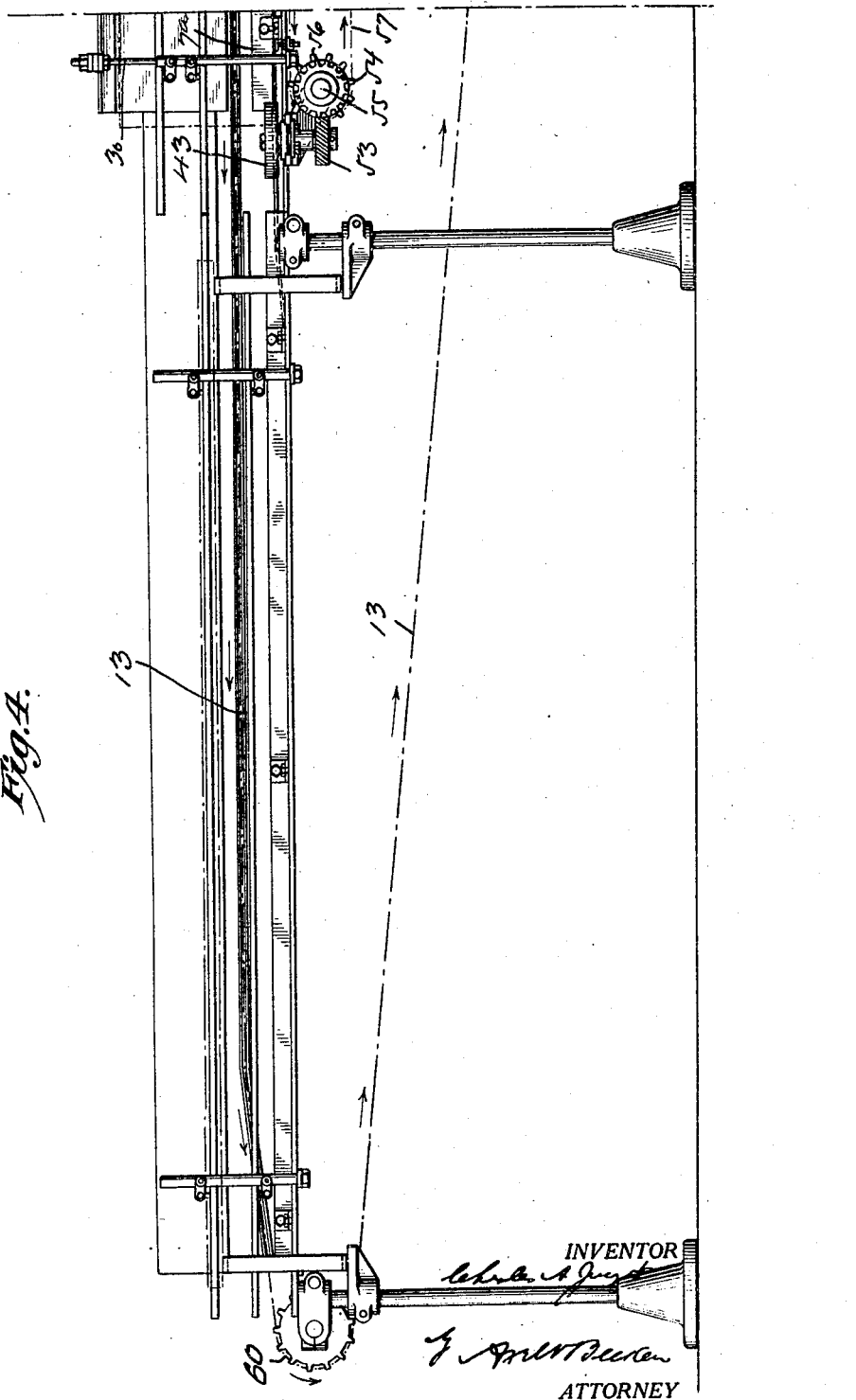

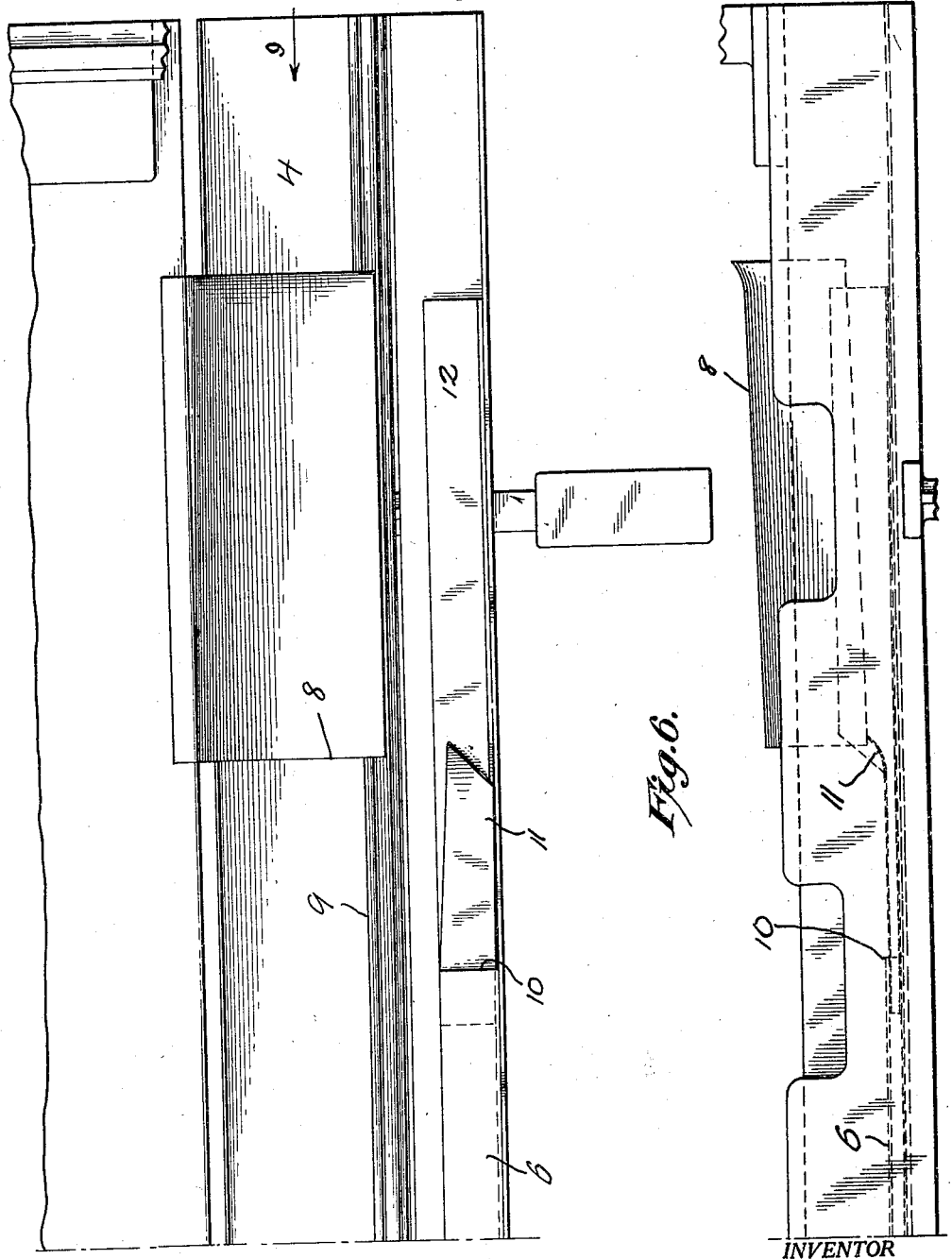

INVENTOR
Charles A. Juengst
BY
ATTORNEY

Oct. 23, 1928.

C. A. JUENGST 1,688,970

ART OF AND MACHINE FOR ASSEMBLING BOOKS

Filed Sept. 7, 1923   14 Sheets-Sheet 11

INVENTOR
Charles A. Juengst
BY
ATTORNEY

Oct. 23, 1928.

C. A. JUENGST 1,688,970

ART OF AND MACHINE FOR ASSEMBLING BOOKS

Filed Sept. 7, 1923 14 Sheets-Sheet 12

Fig.15.

INVENTOR
BY
ATTORNEY

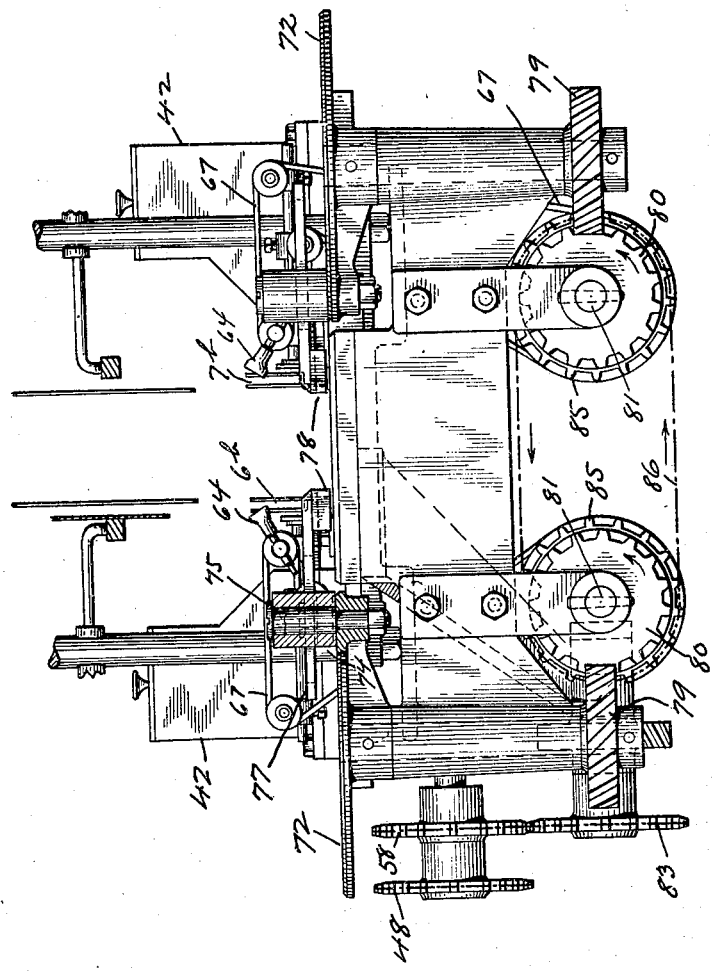

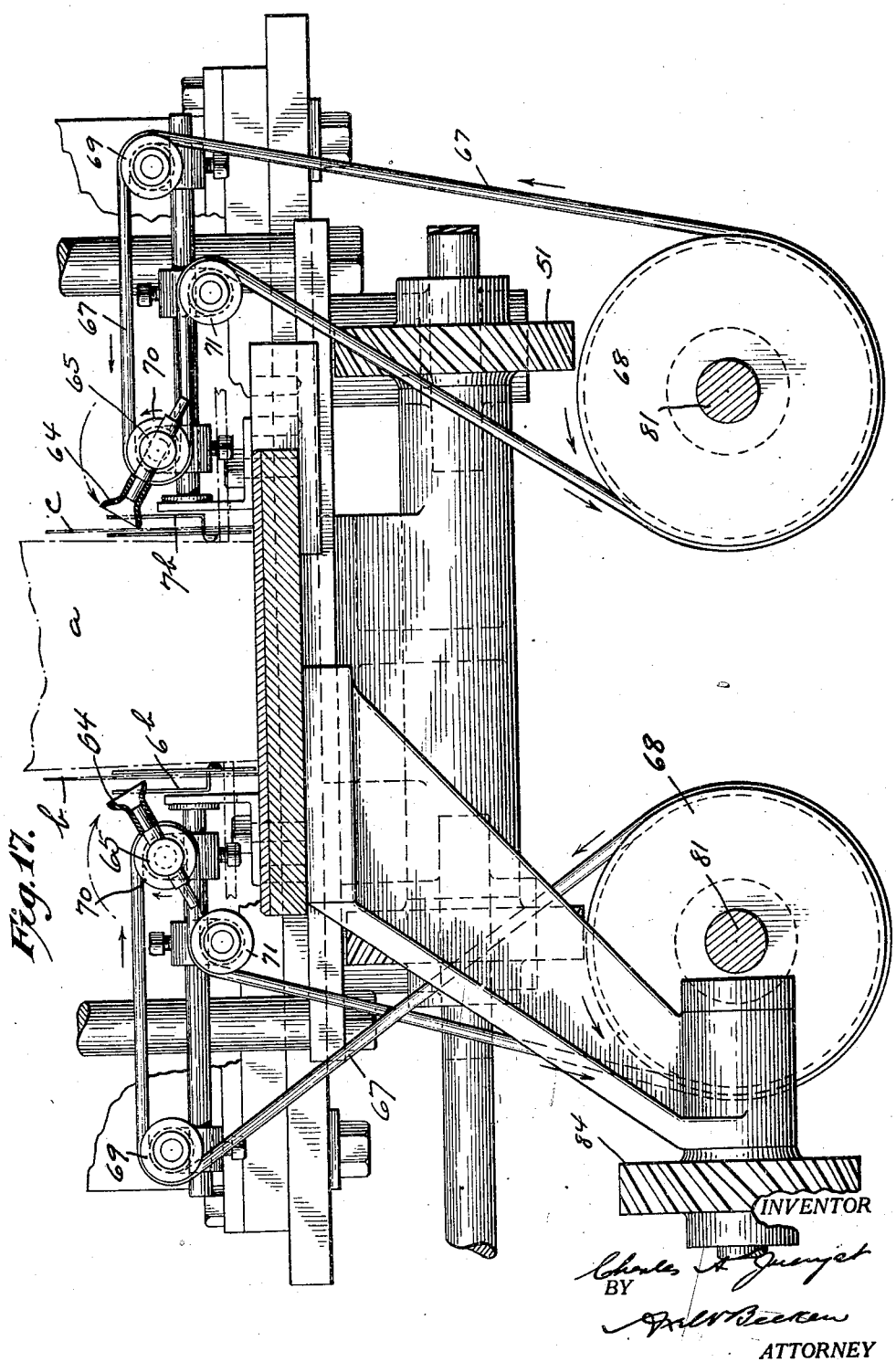

Patented Oct. 23, 1928.

1,688,970

UNITED STATES PATENT OFFICE.

CHARLES A. JUENGST, OF CROTON FALLS, NEW YORK, ASSIGNOR TO AMERICAN ASSEMBLING MACHINE COMPANY, INC., OF MEMPHIS, TENNESSEE, A CORPORATION OF DELAWARE.

ART OF AND MACHINE FOR ASSEMBLING BOOKS.

Application filed September 7, 1923. Serial No. 661,344.

This invention relates to an improvement in the art of, and to a machine for, assembling the signatures of a book, and has for its main object and feature a more expeditious, and less expensive handling of signatures to produce a book as well as an improved mechanism of simple and reliable construction for assembling the signatures.

In the accompanying drawings the invention is disclosed in several concrete and preferred forms in which Figs. 1 to 14 inclusive show one form of the invention.

Figs. 15 to 17 inclusive show a modified form of the invention.

Figs. 1 and 2 when placed end to end show a plan view of a machine embodying the invention, Fig. 1 being the right hand end adjacent to the gathering machine and Fig. 2 being the left hand end of the machine.

Figs. 3 and 4 when placed end to end show a side elevation of the machine, Fig. 3 being the right hand end adjacent to the gathering machine, and Fig. 4 being the left hand end of the machine.

Fig. 5 is a plan view of a portion of the raceway of the gathering machine adjacent to the point where the first signature is placed in the machine.

Fig. 6 is a view in side elevation of the parts shown in Fig. 5.

Fig. 7 is a plan view of a portion of the raceway of the gathering machine adjacent to the point where the last signature is placed in the machine.

Fig. 8 is a view in side elevation of the parts shown in Fig. 7.

Figs. 15 to 17 inclusive show a modified form of the invention.

Fig. 15 is a plan view of a signature presser.

Fig. 16 is an end view looking in the direction of arrow 16 of Fig. 15.

Fig. 17 is a transverse vertical sectional view on the plane of line 17—17 of Fig. 15.

Before assembling signatures into a group that is later to become a book it is customary, under certain conditions, to tip or paste a single to a signature and to place this combined signature and single in the hopper of a gathering machine where it is then gathered in the usual way with other signatures. The tipping is therefore a separate operation that precedes the gathering operation and is performed in a separate machine. So likewise before assembling signatures, especially for books that are intended to be bound in cases, it is customary to tip one signature to another; the signatures so tipped being the end signature and the one next adjacent thereto at both the beginning and end of the book.

The present process may be used in performing this work, and the tipping device herein disclosed may be used as a separate machine independent of any other mechanism, but preferably, and as herein described and illustrated, the process of signature gathering precedes the tipping process and the construction of the gathering machine is coordinated with that of the tipping device, and this is one of the most important features of this invention.

Figure 13:
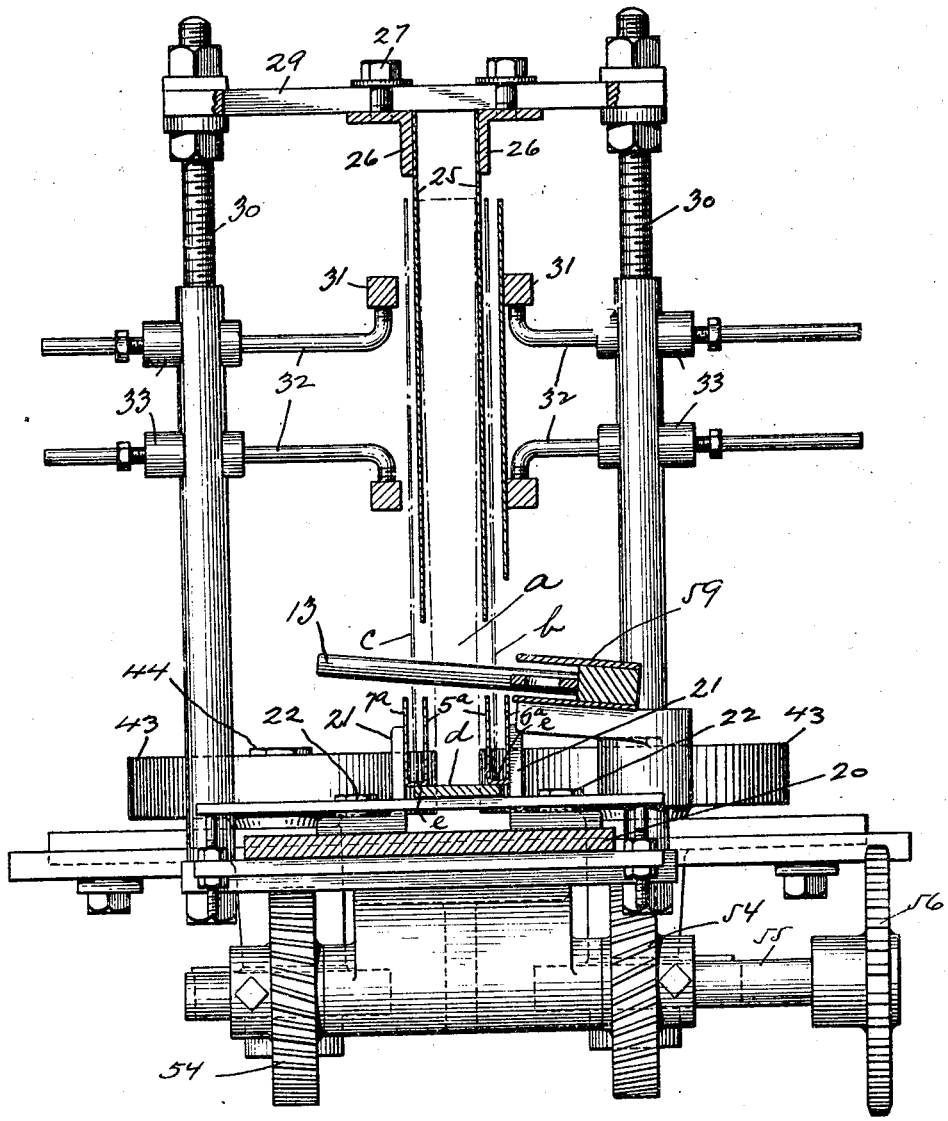
Fig. 13 is a transverse vertical sectional view on the plane of line 13—13 of Figs. 11 and 12.
Figure 14:
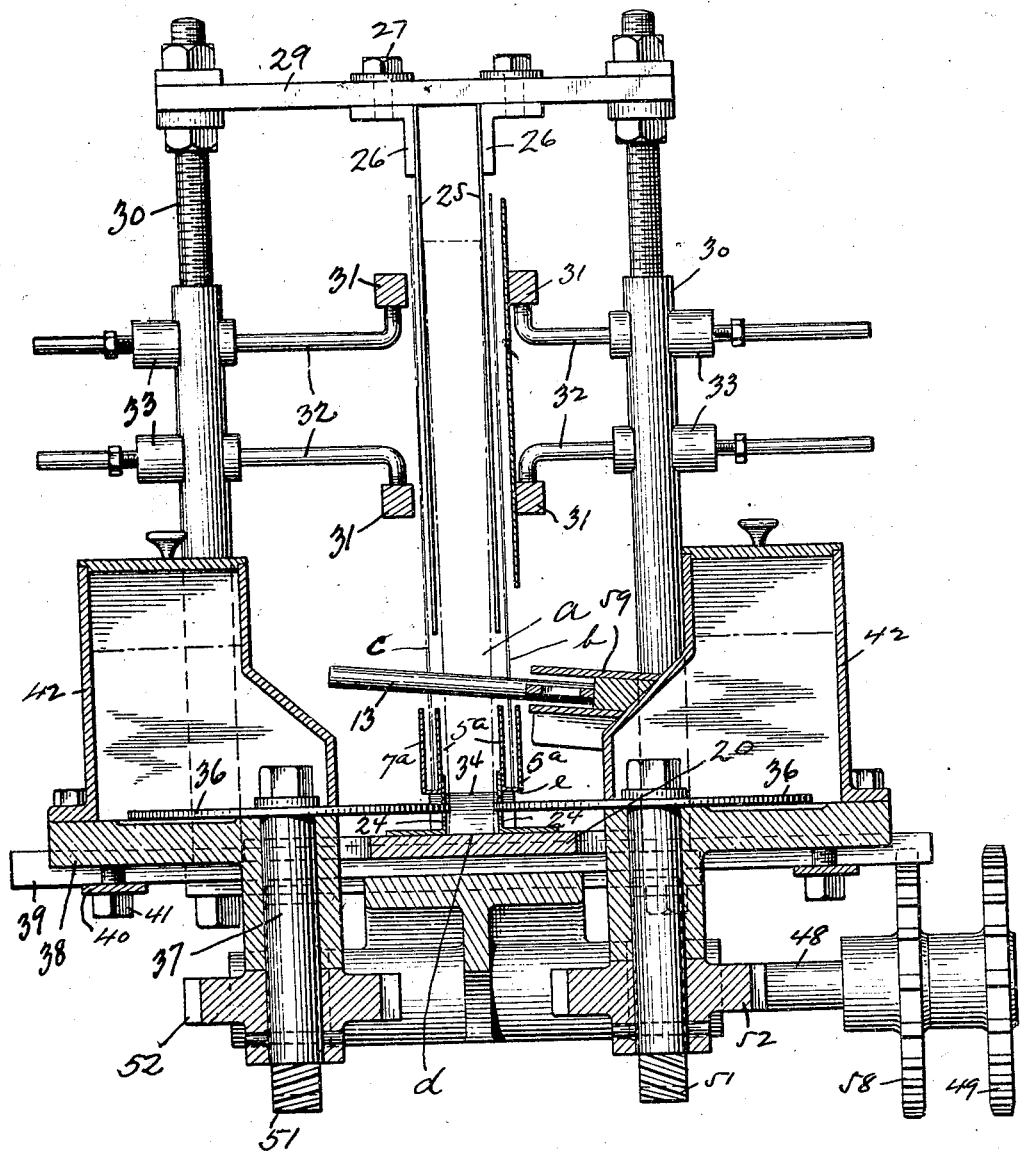
Fig. 14 is a transverse vertical sectional view on the plane of line 14—14 of Figs. 11 and 12.

Considering first the process of tipping per se, without regard to the gathering machine, attention is directed to Fig. 14 in which $a$ indicates a signature or a signature group and $b$ and $c$ indicate other signatures. It will be noted that signatures $a$ and $b$, for instance, are out of alinement with each other thereby exposing a portion of that side of one signature which is adjacent to another signature. The signatures may occupy a flat position but in this instance both $a$, $b$ and $c$ occupy an upright position with their backs lowermost in which position they are advanced by suitable means, and the backs of the signatures are at different levels, $a$ occupying level $d$ and $b$ and $c$ occupying level $e$. In the present showing $a$ is a signature group constituting the main body of the book and $b$ and $c$ are the end signatures. For the purpose of the present discussion it is however sufficient to consider *a* and *b* as being merely two signatures. Owing to the difference in level of these two signatures it is possible to apply a paste line parallel to the back of one of said signatures, say signature *a*. The signatures are then brought into alinement or to the same level, as indicated at *d* and *e* in Fig. 13 and are then pressed together. When I say the same level I do not mean exactly the same level, because sometimes it is desired to tip one signature to another a slight distance from the back of said other signature. Considering now *a* to be a signature group and *b* and *c* to be end signatures it will be evident that the signature group is advanced at a lower level than are the end signatures, and that therefore adhesive my be applied to the exposed portions of the outer sides of the outermost signatures of the group and thereafter the signature group and the end signatures are brought to substantially the same level and pressed together.

Considering the process as being one not merely of tipping, but also as being one of gathering it will be understood that the process involves on setting a plurality of signatures into a group constituting the main body of the book and then tipping an end signature on the outermost signature at both sides of the group. Or, to state the matter still differently, the method of assembling the book consists of bringing signatures into side by side relation, and then tipping the end signatures to the adjacent outer signatures of the main body of signatures.

Figure 9:
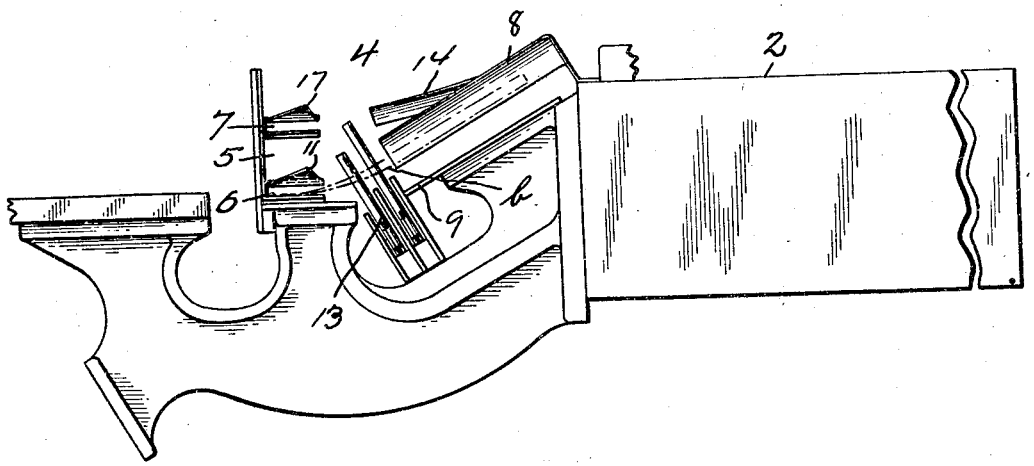
Fig. 9 is an end view of the parts shown in Figs. 5 and 6, looking in the direction of arrow 9 of Fig. 5.
Figure 10:
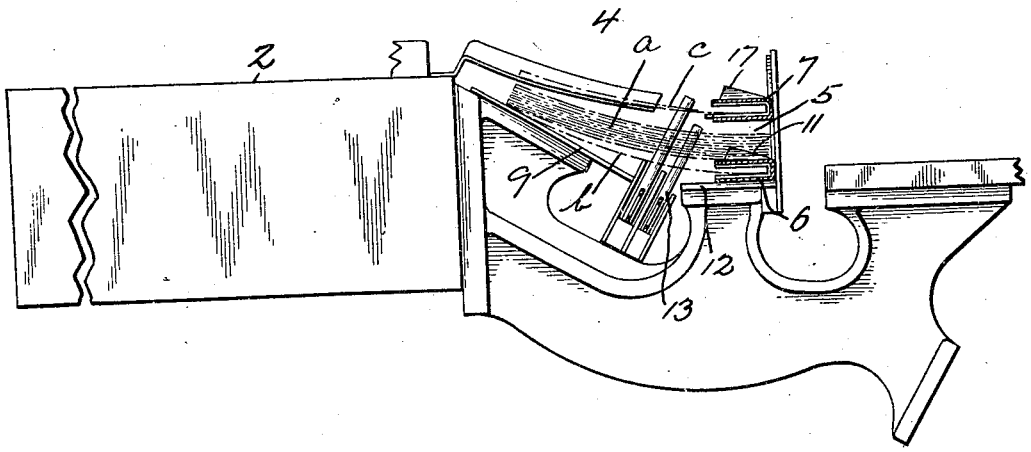
Fig. 10 is an end view of the parts shown in Figs. 7 and 8 looking in the direction of arrow 10 of Fig. 7.

Considering the method of gathering per se this also involves an improvement. As will be seen from Fig. 10 the signatures are piled in such a way that the end signatures *b* and *c* are separated from the main body *a* of signatures, said end signatures lying in separate channels as shown. Or considering *a* and *b* as being merely two signatures they are piled in separated condition.

Now all these processes may be carried on by hand and may be used singly or together, but under modern conditions of bookmaking it is preferable to carry them on, either partly or wholly, by machinery, and accordingly the machines that are to be presently described have been devised.

Referring first to Figs. 1 to 10 inclusive 1 indicates a gathering machine such as the well known Juengst gathering machine provided with a series of hoppers 2 and gripper arms 3, the latter of which takes signatures from the hoppers and places them in raceway 4. Raceway 4 consists of a main central channel 5 and recumbent inwardly opening end channels 6 and 7. Adjacent the hopper of the first signature, which is at the end of the gathering machine farthest from the tipping device, there is located an inclined support 8 above the main support 9 of the raceway (see Figs. 5, 6, 9 and 10). Lower end channel 6 extends from a point near inclined support 8 throughout the remainder of the gathering machine and through tipping machine. The precise point at which channel 6 begins is indicated at 10 and extending rearwardly from said channel is a flaring upper guide 11 and a lower auxiliary support 12. Extending throughout the raceway and into the tipping machine is a chain conveyer 13 having pins that push against the tail of the signatures in a manner well known. It will now be understood that the first signature *b* is placed by a gripper arm upon inclined support 8 and auxiliary support 12, its folded back, if any there be, being on support 12. Chain 13 now engages the tail end of the signature and moves it to the left in Fig. 5 under guide 11 and into channel 6. The main body of signatures *a* are now gathered one by one in superimposed relation resting on main support 9 and on top of channel 6 as will be most readily apparent from Fig. 10, and both signatures *b* and *a* are advanced as a unit by chain 13. Adjacent the hopper of the last signature *c*, that is nearest the tipping machine (Figs. 7, 8, 9 and 10) there is an inclined support 14 above main support 9; an auxiliary support 15 for the folded back of the signatures, said auxiliary support extending into channel 7 which latter begins at point designated by 16. 17 indicates an upper flaring guide extending from channel 7 and in spaced relation to auxiliary support 15. Channel 7 extends through the tipping device. It will now be understood that signature *c* is placed by a gripper arm on supports 14 and 15 and as signatures *a* and *b* are advanced beneath said supports the chain will engage the tail end of signature *c* and will move it toward the left in Fig. 7 into channel 7. Thus the signatures are gathered in separated relation.

Referring now to Figs. 1 to 4 inclusive there is located intermediate gathering machine 1 and tipping machine 18 a spiral raceway 19 similar to the one disclosed in U. S. Letters Patent No. 846,923, dated March 12, 1907, the details of which are not shown and it will be understood that this spiral raceway forms a continuation of the gathering machine raceway and that not only is the main channel twisted but the end channels 6 and 7 and the conveyer chain 13 are likewise twisted. Suitable upper guides similarly twisted are also provided. The function of the spiral is to move the signatures from a flatwise into an upright position. For the sake of clearness the twisted portion of channels 6 and 7 are broken away in most of the drawings.

Figure 11:
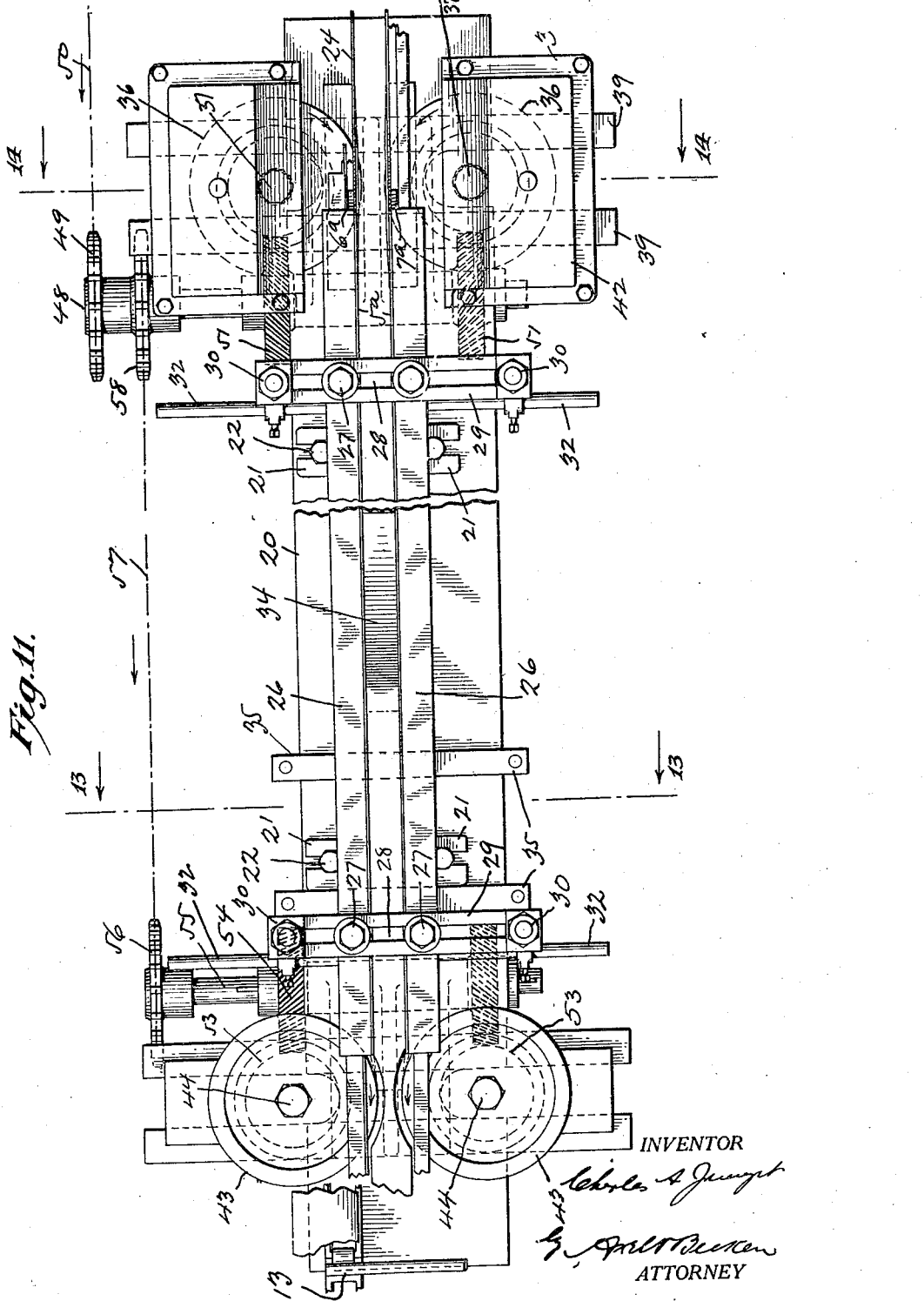
Fig. 11 is a plan view of the tipping device with parts broken away.
Figure 12:
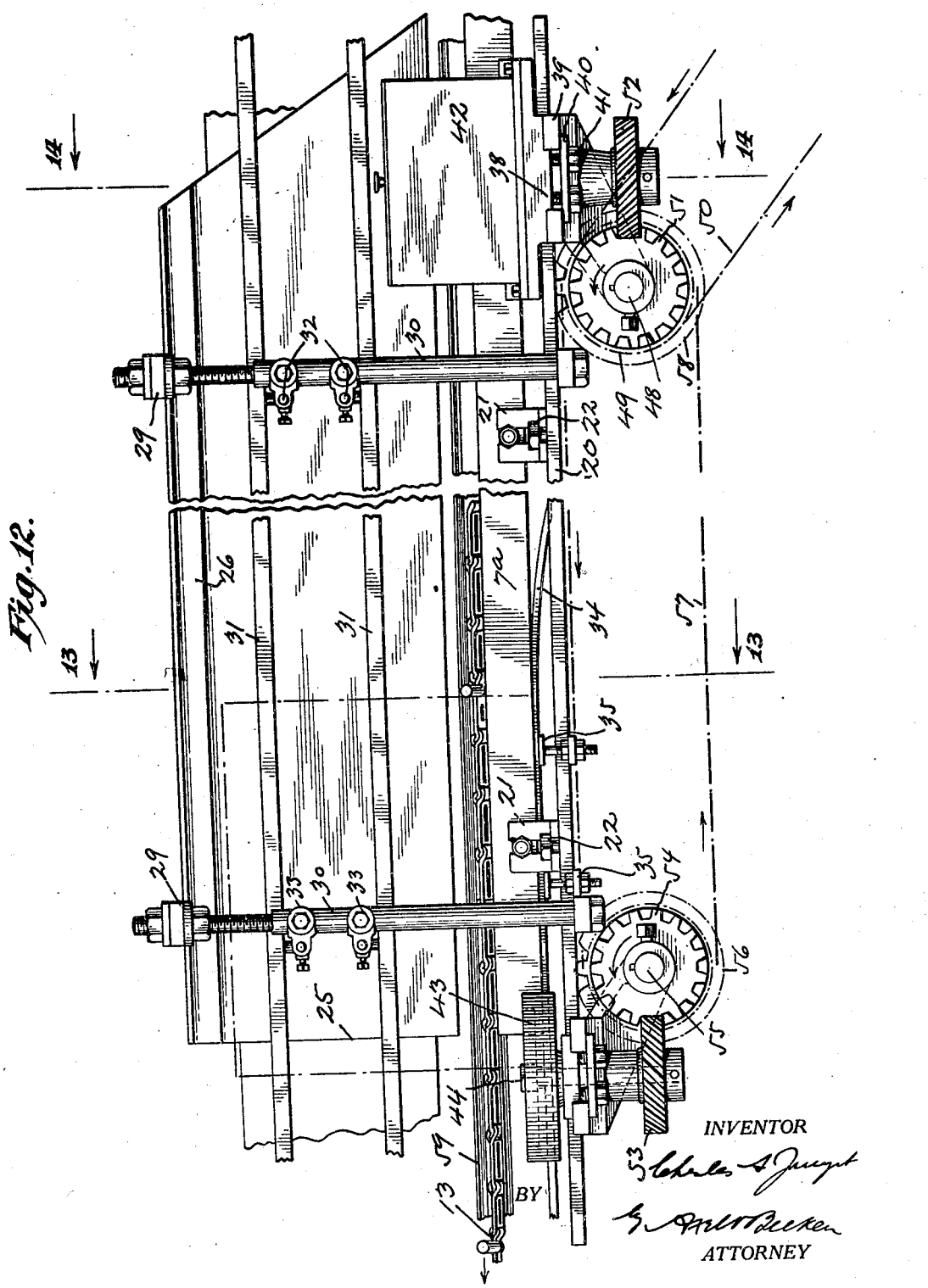
Fig. 12 is a view in side elevation of the tipping device shown in Fig. 11 with parts broken away.

One form of tipping machine is shown in Figs. 1 to 4 inclusive and Figs. 11 to 14 inclusive. In the form there shown 20 indicates a main bed. Arranged on the upper surface and centrally thereof and in spaced and parallel relation with each other, are channels 6ª and 7ª occupying an upright position which form continuations of recumbent channels 6 and 7 of the gathering machine and the space 5ª between these channels forms a continuation of the main channel 5 of the raceway 4 of the gathering machine. Channels 6ª and 7ª are carried by transversely adjustable brackets 21 which are slotted to receive bolts 22 to thereby adjust the machine to different thicknesses of signature groups. 24 indicates lower inner guides carried by channels 6ª and 7ª to guide the lower backs of the signatures of the group where they enter the machine on account of the difference in level between the top of the bed over which the signature group slides and the inside bottom surface of the channels 6ª and 7ª. 25 indicates upper inner guides separating signature group $a$ from signatures $b$ and $c$. These guides are conveniently pendent guides carried by longitudinal angles 26 adjustably bolted in a transverse direction by means of bolts 27 in slots 28 of transverse bars 29. There are here two transverse bars 29, which support longitudinal angles 26, and said bars are carried by four uprights 30. 31 are longitudinally extending upper outer guides to support the upper end of the end signatures, and these guides are carried by arms 32 transversely adjustable in bushings 33 of uprights 30. 34 indicates a ramp carried by supports 35 centrally of the upper surface of bed 20 to bring the main body of signatures to the same level as the end signatures after adhesive has been applied. 36 indicates adhesive applying wheels located adjacent to the infeed end of the tipping machine, that is at the right in Figs. 11 and 12. These adhesive applying wheels rotate in a horizontal plane and extend in beneath channels 6ª and 7ª and through lower inner guides 24 so as to engage the exposed surface of the outer signature of the signature group and apply a line of adhesive thereto. Each of said wheels 36 is mounted on an upright shaft 37 carried by a slide 38 transversely adjustable in guides 39 of the main bed so as to permit adjustment to compensate for adjustment of the channels 6ª and 7ª. 40 is a clamping bar and 41 are bolts to retain the slide in the position to which it has been adjusted. 42 is an adhesive container in which wheel 36 rotates and from which it receives adhesive. This container is carried by slide 38. Adjacent the outfeed end of the tipping machine, that is at the left in Figs. 11 and 12, are two presser members here taking the form of rolls 43 rotating in a horizontal plane and located above main bed 20 and adjacent to the lower ends of the signatures. These presser rolls are mounted on shaft 44 carried by slides adjustable in guides in exactly the same manner as the adhesive applying rolls. The parts may of course be driven by any suitable means, but, in the present instance the gearing is as follows. Power is conveniently derived from the main shaft 45 of the gathering machine and is transmitted to a transverse shaft 46 by means of bevel gears 47. 48 is an adhesive wheel driving shaft which receives its motion from shaft 46 by means of sprockets 49 and chain 50. Mounted on shaft 48 are adjustable spiral gears 51 engaging with similar gears 52 on shaft 37 on which the adhesive applying wheels are mounted. A similar arrangement is used to drive the presser rolls 43 in that gears 53 on shaft 44 are driven from gears 54 adjustable on cross shaft 55, which latter carries a sprocket 56 driven by chain 57 from sprocket 58 on shaft 48. Chain 13 of the gathering machine continues through the tipping machine and passes on its upper run through guides 59 of the tipping machine, thence over idler 60 and down below the machine, thence over sprocket 61 on shaft 46, over idler 62 and back to the gathering machine.

From the foregoing it will be understood that the main signature group $a$ and the end signatures are introduced in an upright position into the tipping machine preferably in one continuous action from the gathering machine; signatures $b$ and $c$ occupying channels 6ª and 7ª and group $a$ occupying the space between the channels. At this time group $a$ is at a lower level $d$ than level $e$ of the channels as shown in Fig. 14. All the signatures are propelled by chain 13 and as the signature group passes between wheels 36 a line of adhesive is applied near the back of the outermost signatures thereof. Further advance of the signature group brings it to ramp 34 which elevates the group and brings it to the same level as the end signatures in channels 6ª and 7ª. Before the narrowest point between pressure rolls 43 is reached the side walls of channels 6ª and 7ª terminate and the end signatures are pressed against the outer signatures of the signature group thereby causing them to adhere and all the signatures now pass as a unit out of the machine or they may pass to a binder such as that shown in Letters Patent No. 1,193,395, dated Aug. 1, 1916.

In Figs. 15 to 17 inclusive a modified form of tipping machine is shown. The adhesive applying means are substantially the same as those previously described, but instead of bringing the signature group up a ramp to the level of the end signatures, the end signatures are brought down to the level of the signature group. This is accomplished by terminating the bottoms of channels 6ᵇ and 7ᵇ at the point 63 a considerable distance from the point where the presser members act on the signatures. To assist the downward movement of the end signatures suckers 64 are provided. Each sucker is rotatably mounted on a shaft 65 mounted in a bushing 66 and motion is imparted to it by means of a belt 67 passing from grooved friction disk 68 over idler 69 over disk 70 carried by shaft 65, over idler 71 and then back to disk 68. Shaft 65 is hollow and is connected to a suction device that alternately exhausts and releases the air in a well understood manner.

In this form of the invention presser devices including parallel bars are used in place of rollers. Each of these devices is constructed as follows: 72 and 73 indicate two disks to which a bar 74 is connected by means of crank pins 75 and 76. Mounted on bar 74 is an adjustable plate 77 and carried by the latter is a presser element 78. Each disk carries a spiral gear 79 and meshing with each of said spiral gears is a similar gear 80. Gears 80 are mounted on shaft 81 which latter also carries grooved disks 68. Motion is imparted to the presser device and the suckers by means of chain 82 from sprocket 58 and reaching to sprocket 83. Moving with sprocket 83 is a spiral gear 84 meshing directly with gear 79 of disk 73 on one side of the machine. Motion is transmitted from one shaft 81 to the other by means of sprockets 85 and chain 86.

As the signatures advance under the influence of the usual chain a line of adhesive is applied to the outer signatures of the main group, the end signatures are then brought down to the level of the main group and presser members 78 move inwardly and forwardly at the speed of the signatures and press them together.

The broad features of the gathering machine per se herein disclosed are not claimed herein but form the subject matter of application Ser. No. 40,853, filed July 1, 1925.

I claim:

1. The method of tipping one signature to another which consists in advancing the two signatures side by side but out of alinement with each other so as to expose a portion of that side of one signature that is adjacent to the other signature, applying adhesive to one of said signatures at the exposed portion thereof, and then bringing the signatures into substantial alinement and pressing them together.

2. The method of tipping end signatures to the outermost signatures of a signature group which consists in advancing the signature group and the end signatures side by side but out of alinement with each other so as to expose a portion of the outer sides of the two outermost signatures of the group, applying adhesive to the exposed portions of the outermost signatures of the group, and then bringing the signature group and the end signatures into substantial alinement and pressing them together.

3. The method of tipping one signature to another which consists in advancing the two signatures in an upright position but at different levels so as to expose a portion of that side of one signature that is adjacent to the other signature, applying adhesive to one of said signatures at the exposed portion thereof and then bringing the signatures to substantially the same level and pressing them together.

4. The method of tipping end signatures to the outermost signatures of a signature group which consists in advancing the signature group and the end signatures in an upright position but at different levels so as to expose a portion of the outer sides of the two outermost signatures of the group, applying adhesive to the exposed portions of the outermost signatures of the group, and then bringing the signature group and the end signatures to substantially the same level and pressing them together.

5. The method of assembling a book which consists in onsetting a plurality of signatures into a group constituting the main body of the book, and then tipping an end signature on the outermost signature at both sides of the group.

6. The method of assembling the signatures of a book which consists in bringing the signatures into side by side relation, and then tipping the end signatures to the adjacent signatures of the main body of signatures.

7. The method of assembling the signatures of a book which consists in piling a plurality of signatures in onset relation with the end signatures separated from the main body thereof, and then tipping said end signatures to the outermost signatures of the main body of signatures.

8. The method of assembling two signatures which consists in piling them in onset relation but in separated condition, then advancing the two signatures out of alinement so as to expose a portion of that side of one signature that is adjacent to the other signature, applying adhesive to one of said signatures at the exposed portion thereof, and then bringing the signatures into substantial alinement and pressing them together.

9. The method of assembling the signatures of a book which consists in piling a plurality of signatures with the end signature separated from the main body of signatures, then advancing the main body of signatures and the end signatures out of alinement so as to expose a portion of the outer sides of the two outermost signatures of the main body of signatures, applying adhesive to the exposed portions of the outermost signatures of the main body of signatures, and then bringing the main body of signatures and the end signatures into substantial alinement and pressing them together.

10. The method of assembling two signatures which consists in piling them in separated condition, then advancing the two signatures in an upright position but at different levels so as to expose a portion of that side of one signature that is adjacent to the other signature, applying adhesive to one of said signatures at the exposed portion thereof, and then bringing the signatures to substantially the same level and pressing them together.

11. The method of assembling the signatures of a book which consists in piling a plurality of signatures with the end signatures separated from the main body of signatures, then advancing the main body of signatures and the end signatures in an upright position but at different levels so as to expose a portion of the outer sides of the two outermost signatures of the main body of signatures, applying adhesive to the exposed portions of the outermost signatures of the main body of signatures, and then bringing the main body of signatures and the end signatures to substantially the same level and pressing them together.

12. A tipping device comprising: a raceway, for receiving and conveying piled signatures, including a main central channel to receive the main body of signatures and auxiliary outer channels to receive the end signatures, an adhesive applying device adjacent said raceway to apply adhesive between the end signatures and the main body of signatures, and means including a pressing device for bringing the end signatures and the main body of signatures firmly into contact.

13. A tipping device comprising: a raceway, for receiving and conveying piled signatures, including a main central channel to receive the main body of signatures and auxiliary outer channels to receive the end signatures, said auxiliary channels being in a different plane from that of the main channel, an adhesive applying device to apply adhesive between the end signatures and the main body of signatures, means for bringing the main body of signatures and the end signatures into the same plane after the adhesive has been applied, and means for pressing the end signatures against the main body of signatures.

14. A tipping device comprising: a raceway, for receiving and conveying piled signatures in an upright position, including a main central channel to receive the main body of signatures in an upright position and auxiliary outer channels to receive the end signatures in an upright position, an adhesive applying device adjacent said raceway to apply adhesive between the end signatures and the main body of signatures, and means including a pressing device for bringing the end signatures and the main body of signatures firmly into contact.

15. A tipping device comprising: a raceway, for receiving and conveying piled signatures in an upright position, including a main central channel to receive the main body of signatures in an upright position and auxiliary outer channels to receive the end signatures in an upright position, said auxiliary outer channels being at a different level from that of the main channel, an adhesive applying device to apply adhesive between the end signatures and the main body of signatures, means for bringing the main body of signatures and the end signatures to the same level after the adhesive has been applied, and means for pressing the end signatures against the main body of signatures.

16. A tipping device comprising: a raceway, for receiving and conveying piled signatures, including a main central channel to receive the main body of signatures and auxiliary outer channels to receive the end signatures, an adhesive applying device adjacent said raceway, to apply adhesive between the end signatures and the main body of signatures, and means including a pressing device, following the advancing movement of the signatures, for bringing the end signatures and the main body of signatures into contact.

17. A tipping device comprising: a raceway, for receiving and conveying piled signatures, including a main central channel to receive the main body of signatures and auxiliary outer channels to receive the end signatures, said auxiliary channels being in a different plane from that of the main channel, an adhesive applying device to apply adhesive between the end signatures and the main body of signatures, means for bringing the main body of signatures and the end signatures into the same plane after the adhesive has been applied, and means, following the advancing movement of the signatures, for pressing the end signatures against the main body of signatures.

18. A tipping device comprising: a raceway, for receiving and conveying piled signatures in an upright position, including a main central channel to receive the main body of signatures in an upright position and auxiliary outer channels to receive the end signatures in an upright position, an adhesive applying device adjacent said raceway to apply adhesive between the end signatures and the main body of signatures, and means including a pressing device, following the advancing movement of the signatures, for bringing the end signatures and the main body of the signatures firmly into contact.

19. A tipping device comprising: a raceway, for receiving and conveying piled signatures in an upright position, including a main central channel to receive the main body of signatures in an upright position and auxiliary outer channels to receive the end signatures in an upright position, said auxiliary outer channels being at a different level from that of the main channel, an adhesive applying device to apply adhesive between the end signatures and the main body of signatures, means for bringing the main body of signatures and the end signatures to the same level after the adhesive has been applied, and means, following the advancing movement of the signatures, for pressing the end signatures against the main body of signatures.

20. A tipping device comprising: a raceway, for receiving and conveying piled signatures in an upright position, including a main central channel to receive the main body of signatures in an upright position and auxiliary outer channels to receive the end signatures in an upright position, said auxiliary outer channels being at a higher level than the main channel, adhesive applying wheels extending in beneath the auxiliary channels to apply adhesive to the main body of signatures, means for bringing the main body of signatures and the end signatures to the same level after the adhesive has been applied, and means for pressing the end signatures against the main body of signatures.

21. A tipping device comprising: a raceway, for receiving and conveying piled signatures in an upright position, including a main central channel to receive the main body of signatures in an upright position and auxiliary outer channels to receive the end signatures in an upright position, said auxiliary outer channels being at a higher level than the main channel, adhesive applying wheels extending in beneath the auxiliary channels to apply adhesive to the main body of signatures, means for bringing the main body of signatures and the end signatures to the same level after the adhesive has been applied, and means, following the advancing movement of the signatures, for pressing the end signatures against the main body of signatures.

22. A tipping device comprising: a raceway, for receiving and conveying piled signatures, including a plurality of channels, an adhesive applying device adjacent said raceway for applying adhesive to one of the signatures, and means including a pressing device for bringing the signatures firmly into contact.

23. A tipping device comprising: a raceway, for receiving and conveying piled signatures, including a plurality of channels arranged in different planes, an adhesive applying device adjacent said raceway for applying adhesive to one of the signatures, means for bringing the signatures into the same plane after adhesive has been applied, and means for pressing the signatures together.

24. A tipping device comprising: a raceway, for receiving and conveying piled signatures in an upright position, including a plurality of channels, an adhesive applying device adjacent said raceway for applying adhesive to one of the signatures, and means including a pressing device for bringing the signatures firmly into contact.

25. A tipping device comprising: a raceway, for receiving and conveying piled signatures in an upright position, including a plurality of channels arranged at different levels, an adhesive applying device adjacent said raceway for applying adhesive to one of the signatures, means for bringing the signatures to the same level after the adhesive has been applied, and means for pressing the signatures firmly into contact.

26. A tipping device comprising: a raceway, for receiving and conveying piled signatures, including a plurality of channels, an adhesive applying device adjacent said raceway for applying adhesive to one of the signatures, and means, following the advancing movement of the signatures, including a pressing device for bringing the signatures firmly into contact.

27. A tipping device comprising: a raceway, for receiving and conveying piled signatures, including a plurality of channels arranged in different planes, an adhesive applying device adjacent said raceway for applying adhesive to one of the signatures, means for bringing the signatures into the same plane after the adhesive has been applied, and means, following the advancing movement of the signatures, for pressing the signatures together.

28. A tipping device comprising: a raceway, for receiving and conveying piled signatures in an upright position, including a plurality of channels, an adhesive applying device adjacent said raceway for applying adhesive to one of the signatures, and means including a pressing device, following the advancing movement of the signatures, for bringing the signatures firmly into contact.

29. A tipping device comprising: a raceway, for receiving and conveying piled signatures in an upright position, including a plurality of channels arranged at different levels, an adhesive applying device adjacent said raceway for applying adhesive to one of the signatures, means for bringing the signatures to the same level after the adhesive has been applied, and means, following the advancing movement of the signatures, for pressing the signatures firmly into contact.

30. A tipping device comprising: a raceway, for receiving and conveying piled signatures in an upright position, including a plurality of channels at different levels, an adhesive applying wheel extending in beneath one of said channels to apply adhesive to the signature in the other channel, means for bringing the signatures to the same level after the adhesive has been applied, and means for pressing the signatures together.

31. A tipping device comprising: a raceway, for receiving and conveying piled signatures in an upright position, including a plurality of channels at different levels, an adhesive applying wheel extending in beneath one of said channels to apply adhesive to the signature in the other channel, means for bringing the signatures to the same level after the adhesive has been applied, and means, following the advancing movement of the signatures, for pressing the signatures together.

32. The combination with a gathering machine for piling signatures in separate channels, of a tipping device having channels forming continuations of the channels of the gathering machine, an adhesive applying means adjacent the tipping machine channels for applying adhesive to one of the signatures, means for pressing the signatures together, and means for conveying the signatures from the gathering machine through the tipping device.

33. The combination with a gathering machine for piling signatures in separate channels, of a tipping device having channels forming continuations of the channels of the gathering machine but located in different planes, an adhesive applying means adjacent the tipping machine channels to apply adhesive to one of the signatures, means for bringing the signatures into the same plane, means for pressing the signatures together, and means for conveying the signatures from the gathering machine through the tipping device.

34. The combination with a gathering machine for piling signatures in a flatwise position in separate channels, of a tipping device having channels for supporting signatures in an upright position, means intermediate the gathering and tipping machines for turning the signatures from a flatwise to an upright position, an adhesive applying means adjacent the tipping machine to apply adhesive to one of the signatures, means for pressing the signatures together, and means for conveying the signatures from the gathering machine through the tipping device.

35. The combination with a gathering machine for piling signatures in a flatwise position in separate channels, of a tipping device having channels for supporting signatures in an upright position but at different levels, means intermediate the gathering and tipping machines for turning the signatures from a flatwise to an upright position, an adhesive applying means adjacent the tipping machine to apply adhesive to one of the signatures, means for bringing the signatures to the same level in the tipping machine, means for pressing the signatures together, and means for conveying the signatures from the gathering machine through the tipping machine.

36. The combination with a gathering machine having a raceway for piling the end signatures in channels separate from the main body of signatures, of a tipping machine having a raceway forming a continuation of the raceway of the gathering machine and having separate channels for the end signatures and the main body of signatures, an adhesive applying means adjacent the tipping machine to apply adhesive between the end signatures and the main body of signatures, means for pressing the end signatures against the main body of signatures, and means for conveying the signatures from the gathering machine through the tipping machine.

37. The combination with a gathering machine having a raceway for piling the end signatures in channels separate from the main body of signatures, of a tipping device having a raceway forming a continuation of the raceway of the gathering machine and having separate channels for the end signatures and main body of signatures, the channels for the end signatures being in a different plane from that of the channel for the main body of signatures, an adhesive applying means adjacent the tipping device to apply adhesive between the end signatures and the main body of signatures, means for bringing all of the signatures into the same plane, means for pressing the end signatures against the main body of signatures, and means for conveying the signatures from the gathering machine through the tipping device.

38. The combination with a gathering machine having a raceway for piling the end signatures in channels separate from the main body of signatures and in a flatwise position, of a tipping device having a raceway forming a continuation of the raceway of the gathering machine and having separate channels for the end signatures and the main body of signatures to support the signatures in an upright position, means intermediate the gathering and tipping machines for turning the signatures from a flatwise to an upright position, an adhesive applying means adjacent the tipping device to apply adhesive between the end signatures and the main body of signatures, means for pressing the end signatures against the main body of signatures, and means for conveying the signatures from the gathering machine through the tipping device.

39. The combination with a gathering machine having a raceway for piling the end signatures in channels separate from the main body of signatures and in a flatwise position, of a tipping device having a raceway forming a continuation of the raceway of the gathering machine and having separate channels for the end signatures and the main body of signatures to support the signatures in an upright position, the channels for the end signatures being at a different level from that of the channel for the main body of signatures, means intermediate the gathering and tipping machines for turning the signatures from a flatwise to an upright position, an adhesive applying means adjacent the tipping device to apply adhesive between the end signatures and the main body of signatures, means for bringing all the signatures to the same level, means for pressing the end signatures against the main body of signatures, and means for conveying the signatures from the gathering machine through the tipping device.

40. A gathering machine comprising: a raceway, a support above the raceway, an inwardly opening channel to receive the back of a signature and means for moving a signature sidewise from the support into the channel.

41. A gathering machine comprising: a raceway, two inwardly opening channels, an upper and a lower one to receive the backs of signatures, one of said channels being longer than the other and said channels being in spaced relation to admit of the main body of signatures being gathered between the channels, a support above the raceway adjacent the beginning of the lower channel, a support above the raceway adjacent the beginning of the upper channel, and means for moving signatures from said supports into the channels.

42. A gathering machine comprising: a raceway, two channels, an upper and a lower in said raceway for the end signatures of a group of signatures to be gathered, said channels being spaced to admit the main body of the signature group therebetween.

Signed at Croton Falls, in the county of Westchester, State of New York, this 29 day of August, 1923.

CHARLES A. JUENGST.